United States Patent [19]

Bachl et al.

[11] 3,897,373

[45] July 29, 1975

[54] SELF-EXTINGUISHING THERMOPLASTIC MOLDING COMPOSITIONS

[75] Inventors: Robert Bachl, Worms; Herbert Naarmann, Wattenheim, both of Germany

[73] Assignee: BASF Aktiengesellschaft, Ludwigshafen (Rhine), Germany

[22] Filed: Apr. 8, 1974

[21] Appl. No.: 458,525

[30] Foreign Application Priority Data
Apr. 21, 1973 Germany............................ 2320535
Oct. 25, 1973 Germany............................ 2353438

[52] U.S. Cl......... 260/2.5 FP; 260/2.5 E; 260/2.5 B; 260/45.7 R; 260/45.7 P; 260/45.9 R; 260/876 R; 260/892; 260/893; 260/898
[51] Int. Cl............................ C08f 47/10; C08j 1/26
[58] Field of Search .... 260/2.5 FP, 45.7 R, DIG. 26

[56] References Cited
UNITED STATES PATENTS
3,058,929  10/1962  Vanderhoff et al............ 260/2.5 FP
3,124,557  3/1964  Eichhorn........................ 260/2.5 FP
3,326,832  6/1967  Rauschenbach et al. ...... 260/2.5 FP

OTHER PUBLICATIONS

Eichhorn, "Synergism of Free Radical Initiators with Self-Extinguishing Additives In Vinyl Aromatic Polymers," J. Appl. Polym. Sci. 8, pages 2497–2524 (1964).

*Primary Examiner*—Morton Foelak
*Attorney, Agent, or Firm*—Johnston, Keil, Thompson & Shurtleff

[57] ABSTRACT

Thermoplastic molding compositions based on styrene polymers and flameproofed with an organic bromine compound. They contain a synergistic azo compound and may be converted to self-extinguishing shaped articles or profiles.

9 Claims, No Drawings

SELF-EXTINGUISHING THERMOPLASTIC MOLDING COMPOSITIONS

This application discloses and claims subject matter described in German Patent Application Nos. P 23 20 535.8 and P 23 53 438.5 filed Apr. 21, 1973 and Oct. 25, 1973, which are incorporated herein by reference.

This invention relates to thermoplastic molding compositions based on styrene polymers flameproofed with an organic bromine compound and additionally containing a synergistic azo compound.

It is known that halogen-containing substances may be used as flameproofing agents for self-extinguishing thermoplastic polymers. To achieve an adequate effect, it is necessary to add relatively large amounts of such substances, and this has a detrimental effect on the mechanical properties of the polymers.

It is also known that the flameproofing action of organic bromine compounds may be improved by the addition of organic peroxides. However, this suffers from the disadvantage that the peroxides are toxic and are liable to decompose explosively.

The use of polymers and oligomers of p-diisopropylbenzene as synergistic agents for bromine-containing flameproofing agents is described in German Application No. 1,255,302. The drawback of these products is that they are insoluble and must therfore be added in the solid state, this rendering them difficult to mix homogeneously with the polymer to be flameproofed. According to J. Eichhorn, J. Appl. Polym. Sci. 8, page 2504 (1964), azodiisobutyronitrile and azodicyclohexanonitrile are also effective. However, these compounds and their decomposition products are very toxic due to the possible formation of hydrocyanic acid. Furthermore, the relatively low solubility of the powders hampers metering and homogeneous distribution thereof in thermoplastics.

It is an object of the invention to provide substances which increase the activity of bromine-containing flameproofing agents without suffering from the drawbacks outlined above.

This object is achieved by thermoplastic molding compositions based on styrene polymers containing an organic bromine compound as flameproofing agent and from 0.01 to 5% by weight of an azo compound of the general formula

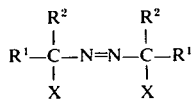

in which $R^1$ and $R^2$ are aliphatic, cycloaliphatic or araliphatic radicals of from 1 to 12 carbon atoms and X denotes chlorine, bromine or an aliphatic, cycloaliphatic or araliphatic radical of from 1 to 12 carbon atoms.

Suitable azo compounds are:
a. 2,2'-dimethyl-[2,2'-azobutane]
b. 2,2'-dimethyl-[2,2'-azodecane]
c. 2,2',4,4'-tetramethyl-[2,2'-azopentane]
d. 3,3'-dimethyl-[3,3'-azopentane]
e. 3,3'-diethyl-[3,3'-azopentane]
f. 3,3'-dibenzyl-[3,3'-azopentane]
g. 2,2',4,4'-tetramethyl-3,3'-dicyclohexyl-[3,3'-azopentane]
h. 2,2',3,3'-tetramethyl-[3,3'-azopentane]
i. 2,2,2',2',3,3'-hexamethyl-[3,3'-azopentane] and
k. 2,2',5,5'-tetramethyl-[4,4'-azohexane].

These azo compounds may be prepared by reaction of dihaloketazines with $Al(R^3)_3$.

The dihaloketazines themselves are suitable for use as synergists. Successfully used compounds are for example:
l. 2,2'-methylchloro-[2,2'-azobutane]
m. 2,2'-methylbromo-[2,2'-azobutane]
n. 2,2'-methylchloro-[2,2'-azodecane]
o. 3,3'-ethylchloro-[3,3'-azopentane]
p. 3,3'-benzylchloro-[3,3'-azopentane].

The dihaloketazines are prepared by condensation of 2 moles of ketone with 1 mole of hydrazine followed by halogenation.

Advantageously, the azo substances should be capable of being metered in the form of liquids. Thus their melting point should preferably be below 20°C and more preferably below 0°C. The compounds should show a low degree of volatility and decomposability, i.e., their boiling point should preferably be higher than 120°C.

Suitable styrene polymers are polystyrene and copolymers of styrene with up to 50% of comonomers. Examples of comonomers are α-methylstyrene, acrylonitrile and acrylates and methacrylates of alcohols of from one to eight carbon atoms. Also suitable are impact-resistant styrene polymers which have been prepared by polymerizing styrene, optionally together with acrylonitrile, in the presence of rubbery polymers of butadiene, isoprene, ethylene/propylene or acrylates, for example impact-resistant polystyrene containing from 2 to 10% by weight of polybutadiene, ABS polymers containing from 5 to 30% by weight of polybutadiene and ASA polymers containing from 10 to 40% by weight of polyacrylate.

Of particular significance are molding compositions suitable for the manufacture of self-extinguishing foams. The expanding agents contained therein are preferably liquid or gaseous organic compounds which are non-solvents for the polymer and have boiling points below the softening point of the polymer, e.g aliphatic or cycloaliphatic hydrocarbons such as propane, butane, pentane, hexane, heptane, cyclohexane and halohydrocarbons such as methyl chloride, dichlorodifluoromethane and 1,2,2-trifluoro-1,1,2-trichloroethane. The amount of expanding agent used is advantageously from 3 to 10% by weight, based on styrene polymer. For further details, see Kunststoffhandbuch, Vol. V, "Polystyrol," Karl Hanser Verlag, chapter 6, "Polystyrol-Schaumstoffe."

The organic bromine compounds should preferably contain at least 4 carbon atoms and more than 40% by weight of bromine. Particularly suitable are those compounds which show a low degree of volatility, have no or only slight plasticizing activity and exhibit no unpleasant odor. Particularly suitable examples are the bromination products of butadiene or isoprene oligomers or polymers, e.g. 1,2,5,6,9,10-hexabromocyclododecane, octabromohexadecane and brominated rubbers. A list of further bromine compounds is given on page 690 of Kunststoffhandbuch, "Polystyrol," cited above. The bromine compounds are used in amounts such as to give a bromine content in the molding compositions of at least 0.1 and not more than 5%, by weight. Preferably, the compositions contain from 0.5 to 3% by weight of bromine.

According to the invention, the molding compositions contain from 0.01 to 5% and preferably from 0.02 to 2%, bt weight, of one or more synergistic azo substances. This does not exclude the possibility of including other flameproofing agents or synergists known in the art.

The molding compositions may contain other components such as fillers, pigments, lubricants, plasticizers, antistatic agents, anti-agers, stabilizers or compounds for assisting foaming.

The synergistic azo substances and the organic bromine compounds may be incorporated into the plastics material for example on rollers, in an extruder or in a kneader. In many cases, they may be added to the monomers prior to polymerization. It is also possible, for example in the manufacture of cast sheeting, to add the polymers and the bromine compound to a solution of the plastics material and to evaporate the solvent.

The molding compositions may be used in a particulate state, e.g. in the form of beads or granules or they may have the form of coarse lumps such as are produced when bulk polymers are milled. The particles advantageously have a diameter of from 0.1 to 6 mm and preferably from 0.4 to 3 mm.

The molding compositions may be converted to self-extinguishing shaped articles or profiles for example by injection molding, extrusion or sintering in molds. On account of their relatively low content of organic halogen compounds, the molding compositions of the invention have softening points which differ only slightly from those of the polymers on which they are based.

It is an advantage that handling of the synergistic azo substances is without danger, unlike other substances employed for increasing the activity of organic bromine compounds. It is also found that the self-extinguishing property of the compositions is maintained even when the compositions are stored for relatively long periods at high temperatures. It is preferably advantageous that the synergistic azo substances have no plasticizing effect on the styrene polymer and are not generally volatile. Thus the compositions are involve no health hazards.

The self-extinguishing shaped articles made from the molding compositions are tested as follows:

Unfoamed compositions are tested by making specimens having the dimensions 0.1 × 10 × 30 cm, whilst foamed compositions are tested by making specimens measuring 0.5 × 15 × 40 cm, in both cases the specimens being held in a gas flame having a height of 40 mm for 5 seconds, whereupon the flame is removed with a steady motion. The extinction time of the specimen after the removal of the flame is a measure of its flame resistance. Molding compositions which are self-extinguishing to an unsatisfactory degree or not at all burn up completely after removal of the flame.

In the following Examples the parts and percentages are by weight.

EXAMPLES 1 to 22

In each Example, 30 parts of a styrene polymer, 0.3 part of an organic bromine compound and various amounts of different synergistic agents are dissolved in 100 parts of methylene chloride. 3 parts of pentane are added to the solution. The solution is then poured onto a glass plate and the methylene chloride is allowed to evaporate at room temperature. The pentane remains homogeneously distributed in the mixture. The resulting film is foamed in steam at 100°C and dried at vacuo at 35°C over 12 hours. The foamed film thus obtained is then subjected to the above flammability test. The results are listed in the Table below. The synergistic agents used are the azo compounds (a) to (k) and the ketazines (l) to (p) mentioned above. y denotes azodiisobutyronitrile and z denotes azodicyclohexanonitrile.

| Example | Bromine compound | Synergist | (%) | Extinction Time (sec) |
|---|---|---|---|---|
| 1 | hexabromocyclododecane | — | — | 12.0 |
| 2 | " | a | 0.05 | 2.5 |
| 3 | " | a | 0.1 | 2.0 |
| 4 | " | a | 0.5 | 1.0 |
| 5 | " | y | 0.5 | 4.7 |
| 6 | " | z | 0.5 | 4.5 |
| 7 | " | b | 0.1 | 2.0 |
| 8 | " | c | 0.5 | 1.0 |
| 9 | " | d | 0.1 | 3.0 |
| 10 | " | e | 0.5 | 3.0 |
| 11 | " | f | 0.1 | 4.0 |
| 12 | " | g | 0.5 | 1.5 |
| 13 | " | h | 0.1 | 4.0 |
| 14 | " | i | 0.1 | 4.0 |
| 15 | " | k | 0.5 | 1.8 |
| 16 | " | e | 0.5 | 1.4 |
| 17 | " | m | 0.5 | 1.2 |
| 18 | " | n | 0.5 | 1.3 |
| 19 | " | o | 0.5 | 2.8 |
| 20 | " | p | 0.5 | 1.9 |
| 21 | 2,3-tris-(dibromopropyl)-phosphate | — | — | 20.0 |
| 22 | " | a | 0.5 | 7.0 |

Examples 1, 5, 6 and 21 are comparative Examples.

EXAMPLE 23

Example 1 was repeated except that a copolymer of 75% of styrene and 25% of acrylonitrile was used. The extinguishing time was 12 sec. After the addition of 0.3% of synergist (a), the extinguishing time fell to 3.5 sec.

EXAMPLE 24

A mixture of 100 parts of a styrene polymer obtained by polymerization of 95 parts of styrene in the presence of 5 parts of polybutadiene, and 1.5 parts of hexabromocyclododecane and 0.5 part of synergist (a) is fed to an extruder having a sheeting die and is ectruded to a film having a thickness of 1 mm. The resulting film is subjected to the flammability test described above. It extinguishes 1 second after removal of the flame. When a film containing no synergist is similarly tested, the film burns up completely.

EXAMPLE 25

A twin-worm extruder has an inlet for liquids at a point about one third along its barrel. A mixture of 100 parts of polystyrene, 1.5 parts of hexabromocyclododecane, 0.3 part of the synergist (b) and 1 part of kaolin is fed to the extruder through its inlet. The temperature in the melting zone is 180°C. In the mixing zone downstream thereof, methyl chloride is fed through the said liquids inlet at such a rate that the mixture extruded contains about 10% of methyl chloride, based on polystyrene. The temperature in the mixing zone is 160°C. In the cooling zone downstream of said mixing zone, the mixture is cooled such that its temperature on leaving the extruder is 110°C. The extrudate foams immediately. The resulting foam has a density of about 40 g/l. The flammability test on a specimen thereof shows an extinction time of less than one half of a second. In a comparative test in which the synergist is omitted, the foam burns for 5.5 seconds before the flame extinguishes.

EXAMPLE 26

0.64 part of polyvinyl pyrrolidone having a K value of 90 and acting as protective colloid and 0.4 part of sodium pyrophosphate are dissolved in 400 parts of water in a stirred vessel. To this solution there are added 200 parts of styrene in which 14 parts of pentane, 0.75 part of benzoyl peroxide, 3 parts of hexabromocyclododecane and 0.4 part of synergist (*d*) have been dissolved. The mixture is heated to 70°C over 20 hours with stirring and is maintained at 85°C for a further 15 hours. The resulting polystyrene containing expanding agent is separated, washed and dried. Prefoamed particles obtained by the action of steam are stored in molds for 1 day and fused to blocks of foamed polystyrene by further treatment with steam. These blocks are cut into panels of foamed material having a thickness of 1.5 cm by means of an electrically heated wire. The panels are stored for a number of days at room temperature and then trimmed to approximately 30 × 40 cm. Said panels are then held edgewise in a bright gas flame and removed therefrom, the time taken for the foamed polystyrene to extinguish being measured. The mean of 10 measurements is 1.3 seconds. If the Example is repeated but without the addition of the synergist, the flame does not extinguish until, on average, 5.4 seconds have elapsed.

We claim:

1. Self-extinguishing thermoplastic molding compositions based on styrene polymers and containing an organic bromine compound containing at least four carbon atoms and more than 40 wt % of bromine as flameproofer and from 0.01 to 5% by weight of an azo compound of the formula

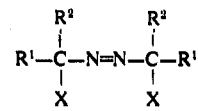

where $R^1$ and $R^2$ denote aliphatic, cycloaliphatic or araliphatic radicals of from one to 12 carbon atoms and X denotes chlorine or bromine or an aliphatic, cycloaliphatic or araliphatic radical of from one to 12 carbon atoms.

2. Self-extinguishing thermoplastic molding compositions as claimed in claim 1, wherein the styrene polymer is polystyrene.

3. Self-extinguishing thermoplastic molding compositions as claimed in claim 1, wherein the styrene polymer is polystyrene which has been modified with from 2 to 10% by weight of polybutadiene to render it impact-resistant.

4. Self-extinguishing thermoplastic molding compositions as claimed in claim 1, wherein the styrene polymer is polystyrene which contains from 3 to 10% by weight of a liquid or gaseous organic expanding agent.

5. Self-extinguishing thermoplastic molding compositions as claimed in claim 1 and which contain an amount of organic bromine compound as flameproofer such that the bromine content of the composition is from 0.1 to 5% by weight.

6. Self-extinguishing thermoplastic molding compositions as claimed in claim 1, wherein the organic bromine compound used is hexabromocyclododecane.

7. Self-extinguishing thermoplastic molding compositions as claimed in claim 1 and containing from 0.02 to 2% by weight of the azo compound.

8. Self-extinguishing thermoplastic molding compositions as claimed in claim 1, wherein the azo compound used is 2,2'-methylchloro-[2,2'-azobutane].

9. Self-extinguishing thermoplastic molding compositions as claimed in claim 1, wherein the azo compound used is 2,2'-dimethyl-[2,2'-azobutane].

* * * * *